Oct. 27, 1953     J. F. STEPHENS     2,656,873
PROCESS AND APPARATUS FOR PRODUCING GLASS FIBROUS TUBES
Filed May 2, 1949
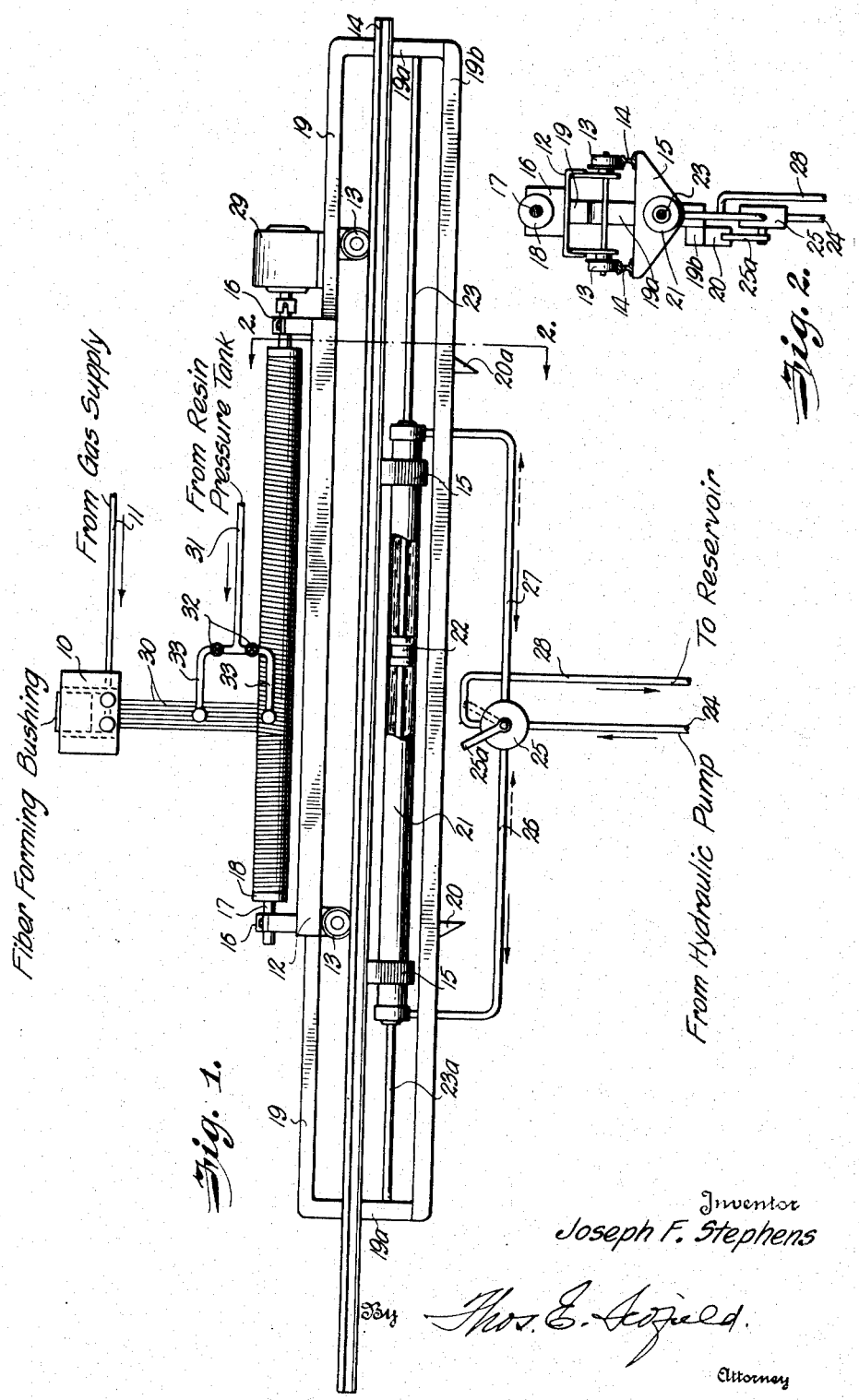
Inventor
Joseph F. Stephens
By Thos. E. Scofield
Attorney Patented Oct. 27, 1953

2,656,873

UNITED STATES PATENT OFFICE 2,656,873

PROCESS AND APPARATUS FOR PRODUCING GLASS FIBROUS TUBES

Joseph F. Stephens, Kansas City, Mo., assignor to Minnesota Mining & Manufacturing Company, a corporation of Delaware Application May 2, 1949, Serial No. 90,848

8 Claims. (Cl. 154—1.7)

This invention relates to improvements in a method for producing glass fiber and manufacturing tubular objects such as pipes therefrom and refers more particularly to a process for forming glass fiber reinforced tubes as the fiber is spun or drawn.

Pipes or conduits have been made by winding fiber glass in the form of a bat around a mandrel, heating the fibers to incipient fusion or to a temperature sufficient to cause the mass to take a permanent set, then subjecting the wound bat to heavy compacting pressure to reduce the outside diameter to the diameter of the finished product. Distinguished from pipes or tubes produced in this fashion are those made by the instant method wherein the fibers are spun directly from the spinneret or bushing and wound upon a mandrel and a binder applied prior to or during the winding operation. The speed of rotation of the mandrel or tubular object on which the fibers are wound determines the character of the fibers since it functions as a wind-up drum attenuating the fibers as they are drawn from the bushing. To build up layers of the fiber the mandrel or tubular object is oscillated longitudinally with respect to the bushing so the fibers are laid up circumferentially upon the outer periphery of the mandrel in the form of spiral helices.

An object therefore of the invention is to provide a method of producing glass fiber and applying it as it is spun upon the periphery of an elongated rotating object.

Another object is to provide a method and apparatus for producing tubular objects of fiber glass by winding the fibers as they are spun in the form of cross helices upon the peripheral surface of a rotating mandrel and reciprocating the mandrel to evenly distribute the fiber in layers.

A further object is to provide a method and apparatus whereby a binder is applied to the glass fiber prior to or during the winding operation, which binder is curable to form an integrated wall structure.

Other and further objects will appear from the description which follows.

In the accompanying drawings which form a part of the specification and are to be read in conjunction therewith, like reference numerals indicate like parts in the various views.

Fig. 1 is a schematic elevational view of an apparatus embodying the invention.

Fig. 2 is a view taken along the line 2—2 in Fig. 1 in the direction of the arrows.

Referring to the drawings, at 10 is shown a portion of a forehearth and a fiber-forming bushing heated by means of gas supplied through pipe 11. 12 is a carriage mounted on flanged wheels 13. Wheels 13 run along tracks 14 carried by support members 15. On the carriage 12 are journals 16 which serve as bearings for shaft 17. Mounted on the shaft and rotating therewith is a cylindrical mandrel 18. Attached to the carriage and oscillatable therewith is a frame consisting of an upper horizontal beam 19 positioned beneath the carriage frame and movable therewith. At the ends of this beam are vertical frame members 19a to the lower end of which is attached an offset horizontal frame member 19b. Attached to the underneath surface of the lower frame member 19b are trip members 20 and 20a. Carried between triangular supports 15 upon which tracks 14 are mounted is a hydraulic cylinder 21. Within the cylinder is a piston 22 to which are connected on its opposite ends piston rods 23 and 23a. The piston rods are attached at their outer extremities to the vertical frame members 19a.

Hydraulic fluid is supplied to the cylinder 21 from a hydraulic pump, not shown, through pipe 24. The fluid is introduced to cylinder 21 on opposite sides of the piston by manipulation of valve 25 having a valve arm 25a movable between the two positions illustrated in the drawing. Valve 25 is of the conventional snap-acting type wherein reversal of the valve head is delayed until arm 25a is moved through its full displacement. If the valve arm 25a is moved to the left or to its full line position, fluid is supplied to the left end of the cylinder through pipe 26. When the valve handle is moved in the opposite direction or to its dotted line position, fluid is supplied to the right end cylinder through pipe 27. While supplying fluid to either side of the piston the hydraulic liquid from the opposite side is discharged through the opposite charging pipe back to the reservoir through pipe 28. Manipulation of the valve is effected by trip members 20 and 20a contacting the valve arm 25a with the reciprocation or oscillating movement of the frame and carriage. Directly connected to shaft 17 and mounted on the reciprocating carriage is a variable speed motor 29 whose rotative speed may be regulated as desired.

Glass fibers drawn from the forehearth and bushing 10 are designated by the numeral 30. To apply a binder to the fibers, resin or other suitable binder material is supplied through pipe 31 and sprayed or surface coated onto the fibers between the bushing and mandrel or after the fibers have been wound. To control the application of binder material, suitable valves 32 are interposed in the supply pipes 33.

In operation, glass fibers are drawn in the usual manner from a bushing or spinneret in the lower part of the forehearth 10. Any number of fibers, according to the number of holes in the bushing, are drawn simultaneously and wound upon the peripheral surface of the mandrel. The speed at which the mandrel is rotated by a motor 29 will determine the character of the fibers. If relatively small fibers are to be spun, the mandrel will be rotated at high speed. If fibers of coarser nature are desired, the mandrel will be rotated at lower speed. In other words, the mandrel functions as a wind-up drum and its speed will determine the character of the fibers produced. While rotating at high speed the mandrel is reciprocated or oscillated below the bushing by introduction of hydraulic fluid on opposite sides of piston 22. The functioning of the hydraulic system in reciprocating the carriage 12 is briefly as follows. The fluid is introduced through pipe 24 and may be charged first to the left side of the piston through pipe 26. This moves the piston to the right hand end of the cylinder, discharging fluid through pipe 27, valve 25 and pipe 28 back to the reservoir. Movement of piston 22 to the right hand end of the cylinder will shift the frame 19 and carriage 12 to the right since the frame is attached to the ends of pistons 23 and 23a. In this position the glass fiber is wound onto the left end of the mandrel. At the end of the stroke, trip member 20 will shift valve arm 25a of valve 25 to its dotted line position directing the fluid from pipe 26 to pipe 27 thereby converting the latter to a charging line and pipe 26 to a discharging line. In other words when the piston 22 arrives at the outer terminus of its stroke at either end of the cylinder the injection and withdrawal of hydraulic fluid are shifted to opposite ends of the cylinder. To control the introduction and withdrawal of hydraulic fluid, valve 25 is manipulated by the abutment of trip members 20 and 20a against valve arm 25a.

Describing now the application of the fibers to the mandrel, when arm 25a is in full line position, as in Fig. 1, fluid is introduced into the left end of the cylinder 21 through pipe 25. Piston 22 moves frame 19 and carriage 12 to the right while the hydraulic fluid to the right of the piston is discharged from the right end of the cylinder through pipe 27, valve 25 and pipe 28. When the piston reaches the end of its stroke, fibers 30 will be wound onto the left end of the mandrel and the stroke will be reversed by trip member 20 moving arm 25a to its dotted line position. Hydraulic fluid now is charged through pipe 27 and is discharged through pipe 26 while the mandrel moves to the left and the fibers 30 are distributed upon the periphery of the mandrel in a continuous helix crossing the fibers applied to the mandrel in the previous stroke. In this manner successive layers of glass fiber are applied circumferentially to the mandrel in successive layers and a tube wall built up to the desired thickness. A binder material such as a resinous substance which may be either thermoplastic or thermosetting is applied to the fiber through pipes 31 and 33.

After the tubular object has been formed on the mandrel 18 it may be removed in any suitable manner. The outer periphery of the mandrel, if collapsible, may be readily removed from the interior of the tube or the fibrous wall of the tube may be cut longitudinally and stripped from the cylindrical surface of the mandrel after which it may be flattened in the form of a mat or again welded to form a tubular object.

Besides producing a tubing or composite pipe by winding a glass fiber as it is produced from the bushings directly onto a mandrel in the manner described, it is contemplated as well to reinforce the pipe axially or in a longitudinal direction by separating laid fiber. This will be done by first applying to the mandrel on which the filaments are helically wound, a layer of glass mat composed of filaments disposed approximately parallel to each other. This layer of glass mat is first applied to the mandrel with filaments parallel to the axis of the tubular shape being formed. These longitudinal fibers give the resultant product greater axial strength than it would have if composed entirely of circumferentially wound filaments in a pattern of opposed helices. By application of alternate layers of unidirectional longitudinal fibers and filaments there can be built up a much more rigid structure or the longitudinally laid fibers may comprise a single inner, outer or intermediate layer with respect to the helically wound filament layers.

In all cases when the mat is layed next to the mandrel or when used in alternate layers with the specially wound fibers the layers are adhered together by the application of a plastic resin used to compose and unite the helically wound filament and mat in an integral structure.

Mats with approximately parallel fiber have been successfully made on a 30″ drum. In building up this layer of fiber on the drum the continuous filaments from the bushing are circumferentially wound about the drum which is transversed back and forth at a relatively slow rate so that the filaments are collected in a form of low-pitched helices, the helices in adjacent layers being opposed. As the filaments are accumulated, a bonding resin is applied to them by any one of several methods. The resin solution or emulsion can be applied to the filament strands as generated from a conventional shoe applicator or sprayed on the filament lay as it is accumulated on the drum; or since the mats being used are quite thin, after the filaments have been wound on the drum, the resin may be painted or sprayed on the outside of the mat. All the foregoing methods are continuous to give the mat a bonded integrity.

After the mat filaments have been wound to a layer of desired thickness they are cut from the drum the cut being made transversely and axially to the lay of the fiber. The circumference of the drum dictates the length of the mat and the length of the drum the width of the mat so formed. Thus, a drum of between 6′ and 7′ in circumference would produce a mat of sufficient length to compose a 10″ pipe section, and a drum 50″ in width would produce a mat adaptable to the production of a pipe or tubing approximately 8″ in diameter.

In the production of actual pipe the process has been successfully used in building up so called enlarged ends or thickened wall sections adjacent the ends. Such thickened walls may be desirable in order to provide end couplings for the pipe. In forming these thickened wall sections it is necessary to limit the travel distance which the mandrel or drum traverses to cause the filament to wrap only about the area to be thickened and reinforced. Likewise it is possible to include by this method additional layers of the unidirectional mat in the thickened wall section to balance the diametral and axial strength of the reinforced portion.

From the foregoing it will be seen that this invention is one well adapted to attain all of the ends and objects hereinabove set forth together with other advantages which are obvious and which are inherent to the process and apparatus.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

I claim:

1. An integrated process of producing glass fiber and forming fibrous tubular structures comprising the steps of passing molten glass through the apertures of a bushing to form a plurality of individual fibers, wrapping said fibers circumferentially upon the peripheral surface of an elongated object while rotating said object at a high speed commensurate with the size of the fiber to be drawn, applying a binder to the fibers, laying up the fibers upon the rotating object in layers to form a compact unitary structure and removing the object longitudinally from within the structure to produce an integral fibrous tube.

2. A method as in claim 1 including the steps of shifting the rotating object longitudinally during the application of the fibers whereby the fibers are laid up as cross helices.

3. A method as in claim 1 including the step of longitudinally oscillating the rotating object during application of the fibers whereby the fibers are laid up as cross helices.

4. A method as in claim 1 including the step of curing the binder subsequent to laying up the binder treated fibers on the rotating object.

5. In an apparatus for producing tubular objects of glass fiber, the combination with a receptacle containing a batch of molten glass, of a bushing for feeding the glass in a plurality of individual continuous fibers, an oscillating carriage positioned adjacent said bushing adapted to travel in a path transverse to the fiber feed, a mandrel rotatably mounted upon said carriage, drive means mounted on said carriage for rotating said mandrel to wind the fibers thereupon as they are spun from the bushing, and means for reciprocating the carriage whereby the fibers are applied circumferentially and in successive layers upon the peripheral surface of the mandrel.

6. Apparatus as in claim 5 including means for limiting the reciprocal travel of the carriage to slightly less than the length of the mandrel.

7. Apparatus as in claim 5 in which the means for reciprocating the carriage comprises a stationary cylinder, a reciprocable piston operatively connected to the carriage, and valve controlled ducts for supplying a fluid under pressure to the cylinder on opposite sides of the piston for reciprocating the piston and carriage.

8. Apparatus as in claim 5 in which the means for reciprocating the carriage comprises a stationary cylinder, a reciprocable piston operatively connected to the carriage, valve controlled ducts for supplying a fluid under pressure to the cylinder on opposite sides of the piston for reciprocating the piston and carriage, and tripping mechanism adapted to automatically operate the valve to alternately charge pressure fluid to opposite ends of the cylinder.

JOSEPH F. STEPHENS.

References Cited in the file of this patent

UNITED STATES PATENTS

| Number | Name | Date |
| --- | --- | --- |
| 1,641,300 | Spencer | Sept. 6, 1927 |
| 1,781,134 | Shoemaker | Nov. 11, 1930 |
| 2,076,729 | Kennedy | Apr. 13, 1937 |
| 2,177,260 | Laube | Oct. 24, 1939 |
| 2,383,733 | Parker | Aug. 28, 1945 |
| 2,454,074 | Marc | Nov. 16, 1948 |
| 2,461,855 | Tornberg | Feb. 15, 1949 |
| 2,467,999 | Stephens | Apr. 19, 1949 |
| 2,478,486 | Holleron | Aug. 9, 1949 |
| 2,546,230 | Modigliani | Mar. 27, 1951 |